9579X
No Printed Specification Available
Boston & Bryan,
Soda Fountain,
Patented Apr. 11, 1836.
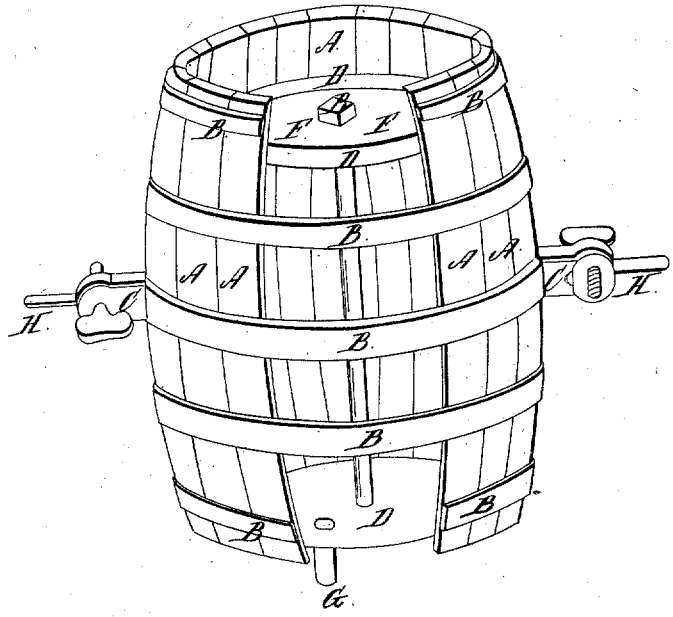
N. PETERS, PHOTO-LITHOGRAPHER, WASHINGTON, D. C.

9579X apl.11.1836 301.

Robert Boston and Thomas Bryan, New York.

Letters Patent.

The schedule referred to in these Letters Patent, and making
part of the same, containing a description in the words of the said
Robert Boston & Thomas Bryan, themselves of their improvement
in the construction of fountains for soda or other mineral waters.

To all to whom these presents shall come: Be it known that we
Robert Boston and Thomas Bryan, both of the City and County of
New York, and State of New York, have invented a new and useful
improvement in the construction of fountains of wood for soda
water or other mineral waters, or other liquids, where great
pressure or condensing of gas is necessary, and that the following
is a full true and exact description of the said improvement. Fountains
are made of wood in the ordinary form of barrels or casks with
staves bound together by a sufficient number of hoops, of sufficient
strength to sustain the pressure or condensing of gas required, some
or all of the said hoops are so constructed as to clasp the fountain with
screws; so that the said staves of the fountain may be tightened or
compressed together from time to time as may be required. The ends or
heads of the said fountain, in addition to the ordinary means of secur-
ing the heads of barrels or casks are secured by one or more metallic
bolts or bars passing through sufficient and suitable apertures in the
said ends or heads, and through the interior of the fountain, the said
bolts or bars are secured on the outer surface of one head or end of the
fountain by sufficient and suitable flanges, and on the other end or head
of the fountain by similar flanges and nuts screwed upon correspond-
ing screws on the said bolts or bars so that the said ends or heads
may be from time to time tightened as may be required. In case the
said bolts or bars are constructed of any metallic substance or
substances, in order to prevent and avoid the corrosive effects of
soda 302. 9579X Soda or other Mineral water upon such Metallic substances the said metallic bolts or bars are tinned, or covered with varnish or some other substance insoluble in said mineral waters, or they may be cased or inclosed in bars of wood sufficiently bored for that purpose, and so secured at each extremity as to be water tight. The fountain may rest or swing upon pivots attached to the middle hoop and the staves may be so constructed as to project above the upper end or head of the fountain sufficiently to form a suitable receptacle for ice for the purpose of cooling the contents of the fountain when desired, a flange and screw are inserted in one head or end of the fountain to which a pipe or tube may be attached so as to draw off with a suitable cap, the contents of the fountain. Each fountain may be proved so as to fix with accuracy the pressure or condensing of gass it will bear. and We the said Robert Boston and Thomas Bryan have hereunto annexed a view or drawing of the said above described fountains, the particular parts whereof are marked with the letters of the alphabet, and to which particular parts respectively we hereinafter refer by corresponding letters. A represent the said staves. B. represent the said hoops. C. represent the mode of tightening by means of screws affixed to the hoops as herein before described D. represent the said ends or heads. E. represent the said bolts or bars. F. represent the aforementioned fastenings of the said bolts or bars. G. represents the flange and screw to which a pipe or tube may be attached as hereinbefore described. H represents the said pivots hereinbefore mentioned. In order that the drawing or view may represent the interior of the said fountains it presents the appearance of a fountain from which one or more staves have been taken, the upper and lower hoops also for the like purpose are represented as imperfect. And we the said Robert Boston and Thomas Bryan, claim as our joint and original invention in the above described fountains, the use of the said bolts or bars and of the said flanges thereunto affixed so as to prevent the bursting of the said fountains when constructed of wood as hereinbefore described and set forth by the

9579X the pressure or condensing of gases therein. And we have therefore hereunto set our hands the thirtieth day of January in the year one thousand eight hundred and thirty six.

Witnesses
A. Tucker
P. Fisk

R. Boston
Thos. Bryan

Drawing